United States Patent
Aisaka et al.

(10) Patent No.: US 6,832,097 B2
(45) Date of Patent: Dec. 14, 2004

(54) RADIO COMMUNICATION APPARATUS AND TRANSMISSION POWER CONTROLLING APPARATUS

(75) Inventors: Hideki Aisaka, Hino (JP); Masanori Niwa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 475 days.

(21) Appl. No.: 10/102,825

(22) Filed: Mar. 22, 2002

(65) Prior Publication Data

US 2002/0137536 A1 Sep. 26, 2002

(30) Foreign Application Priority Data

Mar. 23, 2001 (JP) ........................................ 2001-086230

(51) Int. Cl.[7] .............................................. H04B 7/10
(52) U.S. Cl. ..................... 455/522; 455/69; 455/101; 455/114.2; 455/127.2; 375/299; 375/315
(58) Field of Search .......................... 455/522, 550.1, 455/60, 101, 127.1, 127.2, 127.3, 129, 575.7, 114.2; 375/299, 315

(56) References Cited

U.S. PATENT DOCUMENTS

| | | | | |
|---|---|---|---|---|
| 4,956,643 A | * | 9/1990 | Hahn et al. ................... 342/51 |
| 5,564,075 A | * | 10/1996 | Gourgue ....................... 455/69 |
| 5,715,526 A | * | 2/1998 | Weaver et al. ............... 455/126 |
| 6,236,841 B1 | * | 5/2001 | Akiya .......................... 455/91 |
| 6,289,036 B1 | * | 9/2001 | Saito et al. .................. 375/130 |
| 6,628,733 B1 | * | 9/2003 | Tomiyoshi et al. ......... 375/347 |

* cited by examiner

*Primary Examiner*—Edward F. Urban
*Assistant Examiner*—Huy Phan
(74) *Attorney, Agent, or Firm*—Finnegan, Henderson, Farabow, Garrett & Dunner, L.L.P.

(57) ABSTRACT

When an antenna switching unit selects a first antenna and a reference gain does not exceed a first limit value, a gain of a variable amplifier is set to the reference gain. When the antenna switching unit selects the first antenna and the reference gain exceeds the first limit value, the gain of the variable amplifier is set to the first limit value. When the antenna switching unit selects a second antenna and the reference gain does not exceed a second limit value, the gain of the variable amplifier is set to the reference gain. When the antenna switching unit selects the second antenna and the reference gain exceeds the second limit value, the gain of the variable amplifier is set to the second limit value.

6 Claims, 8 Drawing Sheets

RADIO COMMUNICATION APPARATUS AND TRANSMISSION POWER CONTROLLING APPARATUS

CROSS REFERENCE TO RELATED APPLICATIONS

This application is base upon and claims the benefit of priority from the prior Japanese Patent Application No. 2001-086230, filed Mar. 23, 2001, the entire contents of which are incorporated herein by reference.

BACKGROUND OF THE INVENTION

1. Field of the Invention

The present invention relates to a radio communication apparatus for controlling a transmission power in a variable way in accordance with a reception power and a transmission power controlling apparatus used in the radio communication apparatus.

2. Description of the Related Art

Figure 1:
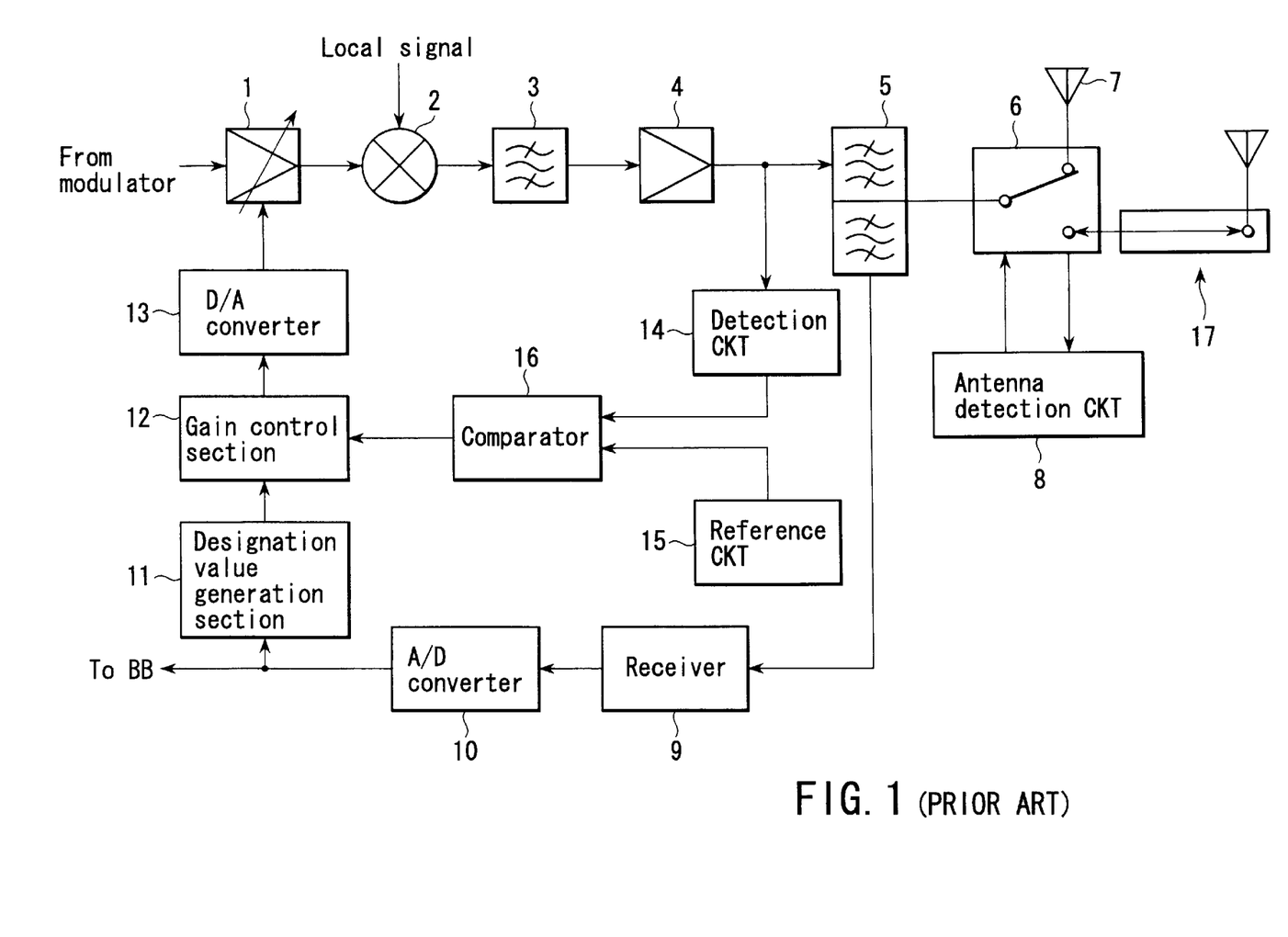
FIG. 1 is a block diagram showing a conventional radio communication apparatus.

FIG. 1 is a block diagram showing a radio communication apparatus provided on an existing mobile telephone terminal.

In the radio communication apparatus, a transmit signal applied from a modulator, not shown, is processed by a variable amplifier 1, up-converter 2 and bandpass filter 3 and a power amplifier 4 to provide a transmit signal of a state capable of radio transmission. The transmit signal is passed through a duplexer 5 and antenna switching unit 6 normally to a standard antenna 7 where it is radiated as a radio wave.

An external antenna 17 can be connected to the antenna switching unit 6. Whether or not the external antenna 17 is connected is monitored by an antenna detection circuit 8. If the external antenna 17 is connected, the external antenna 17 is selected by the antenna switching unit 6 under control of the antenna detection circuit 8. With the external antenna 17 thus connected, the transmit signal outputted from the power amplifier 4 is supplied through the duplexer 5 and antenna switching unit 6 to the external antenna 17 where it is radiated as a radio wave.

A radio wave is received by the standard antenna 7 or external antenna 17 as a received signal. The received signal is sent through the antenna switching unit 6 and duplexer 5 to a receiver 9. The received signal is converted to a digital-like baseband signal by the receiver 9 and an A/D converter 10 and then supplied to a baseband processing section not shown.

The transmission power can be controlled by a gain of the variable amplifier 1 and it is basically determined by a reception power. That is, it is considered that a greater reception power ensures a better state of a radio channel. Therefore, even if the transmission power is made lower, an adequate communication quality can be maintained and the transmission power can be lowered. If, on the other hand, a reception power is smaller, then the transmission power is increased so as to secure an adequate communication quality.

Therefore, a designation value generation section 11 monitors an output of the A/D converter 10 and determines a gain capable of achieving a transmission power corresponding to the reception power. A gain control section 12 basically outputs a gain controlled value for allowing an amplification to be done, by the variable amplifier, with the gain determined by the designation value generation section 11. Then, the gain controlled value is converted by the D/A converter 13 from a digital form to an analog version to obtain a gain control signal. The gain control signal is applied to a variable amplifier 1.

By a first loop thus constituting an open loop, a basic transmission power control is carried out.

If, however, the transmission power is so controlled by the first loop only, when a reception power involves a largely lowered state, control acts toward largely increasing a transmission power. And there is a risk that the transmission power will exceed a maximum transmission power determined legally or from a standpoint of a system involved.

In order to stabilize the transmission power to a maximal transmission power, therefore, a second loop is provided which comprises a detection circuit 14, reference circuit 15 and comparator 16. If a gain determined by the designation value generation section 11 exceeds a given threshold value, the transmission power control by the first loop is stopped and the transmission power control by the second loop is carried out.

Figure 2:
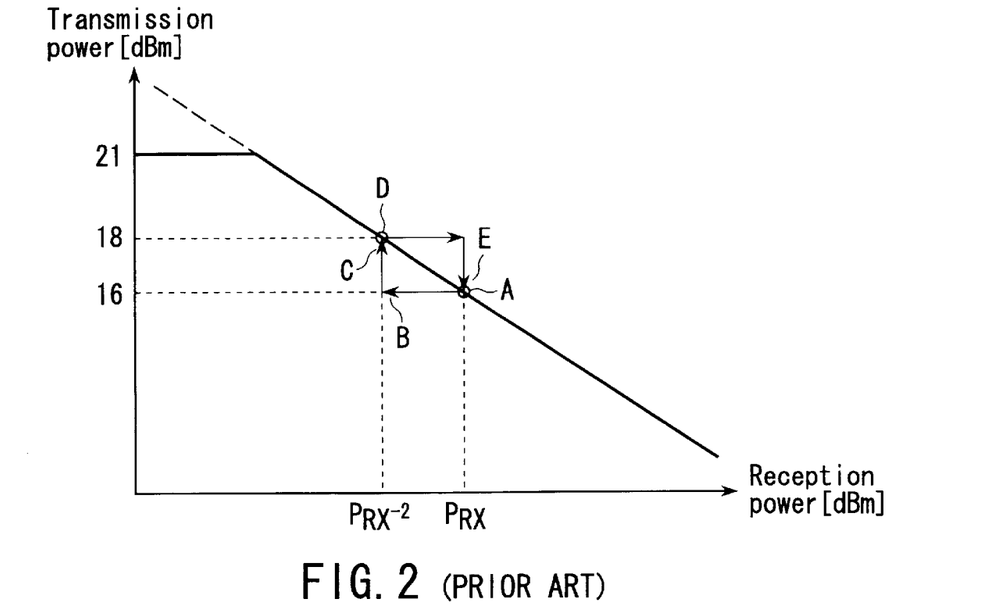
FIG. 2 is an explanatory view showing a state in which a lowering in a transmission power is compensated under the use of an external antenna 17 in the radio communication apparatus in FIG. 1.

As a result, the reception power/transmission power relation is as shown in FIG. 2 and the transmission power is restricted by the maximum transmission power. FIG. 2 shows an example in which the maximal transmission power is 21 dBm.

The gain determinations by the first and second loops are done under a condition based on the use of the standard antenna 7 in either case. However, there are often the cases where a loss differ between the standard antenna 7 and the external antenna 17. Stated in more detail, the external antenna 17 is often greater in a loss than the standard antenna 7 from the standpoint of its longer cable length, etc. Under the situation above, even if the gain of the variable amplifier 1 is the same, there occurs the difference in transmission power between using the standard antenna and using the external antenna 17.

In the case of performing the transmission power control by the first loop, the difference in the loss appears also in the reception power due to the difference between the antennas used. In order to compensate the difference in the loss, the setting of the gain is carried out. Stated in more detail, as shown in FIG. 2, suppose that the reception power at the time of using the standard antenna 7 is $P_{RX}$ and hence the operation point is located at a point A and control is made such that the transmission power becomes 16 dBm. In this case, suppose that the external antenna 17 is connected and the loss are increased to 2 dBm. Then the reception power detected by the designation value generation section 11 is lowered to $P_{RX}-2$ as indicated by an arrow B. And the designation value generation section 11 increases a gain so as to increase the transmission power to 18 dBm as indicated by an arrow C. And the operation point is varied to a point D. As a result, an output level from the variable amplifier 1 is increased up to a level corresponding to the transmission power of 18 dBm. Since a loss by the external antenna 17 is involved as indicated by an arrow E, the actual transmission power becomes 16 dm, so that the operation is performed at the same point A as at the time of using the standard antenna 7.

Figure 3:
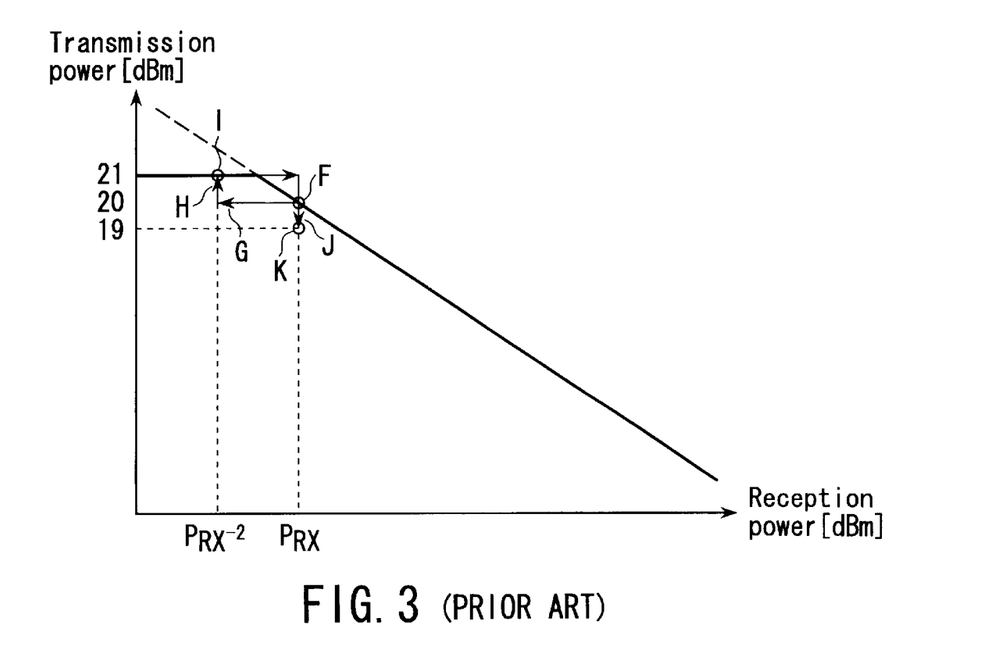
FIG. 3 is an explanatory view showing a state in which a lowering in a transmission power is not fully compensated under the use of the external antenna 17 in the radio communication apparatus in FIG. 1.

As shown in FIG. 3, suppose that the operation point at the time of using the standard antenna 7 is located at a point F near a threshold value "21". In this state, suppose that the external antenna 17 is connected and the loss is 2 dBm increased. Then the reception power detected by the designation value generation section 11 is lowered to $P_{RX}-2$ as indicated by an arrow G. In this case, the designation value generation section 11 tries to increase a gain so as to increase the transmission power to 22 dBm, but it exceeds the threshold value. And the second loop operates. That is, the transmission power at the time of using the standard antenna 7 is suppressed under the action of the second loop to a gain of 21 dBm and the operation point becomes a point I. Then, as indicated by an arrow J, a loss by the external antenna 17 is involved and the actual transmission power becomes 19 dBm. And the operation is done at an operation point K different from that at the time of using the standard antenna 7. For this reason, the transmission power is lowered.

As set out above, the conventional apparatus was not able to properly control the transmission power at all times.

BRIEF SUMMARY OF THE INVENTION

The present invention is achieved with the above-mentioned situations in view and, accordingly, the object of the present invention is to provide an apparatus which can properly control a transmission power even if either of a standard first antenna and external second antenna is used.

In one aspect of the present invention, there is provided a radio communication apparatus for varying a transmission power in accordance with a reception power in a range not exceeding a predetermined maximum transmission power, comprising: a variable amplifier configured to amplify a transmit signal, the gain of the variable amplifier being variable upon amplification; a first antenna; an antenna switching unit detachable to a second antenna and configured to select one of the first and second antennas if the second antenna is attached to the apparatus; and a transmission power controller configured to control the gain of the variable amplifier such that if the antenna switching unit selects the first antenna and a standard gain determined in accordance with the reception power does not exceed a first predetermined limit value determined by the maximum transmission power and power loss at the first antenna, the gain of the variable amplifier is set to the standard gain;

if the antenna switching unit selects the first antenna and the reference gain exceeds the first limit value, the gain of the variable amplifier is set to the first limit value;

if the antenna switching circuit selects the second antenna and the standard gain does not exceed a second predetermined limit value determined by correcting the first control value based on a difference between a power loss at the first antenna and a power loss at the second antenna, the gain of the variable amplifier is set to the standard gain; and if the antenna switching unit selects the second antenna and the standard gain exceeds the second limit value, the gain of the variable amplifier is set to the second limit value.

In another aspect of the present invention, there is provided a transmission power controlling apparatus supplied to a radio communication apparatus adapted to vary a transmission power in accordance with a reception power in a range not exceeding a predetermined maximum transmission power and comprising a variable amplifier configured to amplify a transmit signal, the gain of the variable amplifier being variable upon amplification, a first antenna and an antenna switching unit arbitrarily connectable to a second antenna and configured to select one of the first antenna and second antenna, the transmission power controlling apparatus controlling the transmission power at the radio communication apparatus and comprising a transmission power controller configured to control a gain of that variable amplifier such that if the antenna switching unit selects the first antenna and a reference gain determined in accordance with the reception power does not exceed a first predetermined limit value determined by the maximum transmission power and power loss at the first antenna, a gain of the variable amplifier is set to the reference gain;

if the antenna switching unit selects the first antenna and the reference gain exceeds the first limit value, the gain of the variable amplifier is set to the first limit value;

if the antenna switching unit selects the second antenna and the reference gain does not exceed a second predetermined limit value determined by correcting the first limit value based on a difference between a power loss at the first antenna and a power loss at the second antenna, the gain of the variable amplifier is set to the reference gain; and if the antenna switching unit selects the second antenna and the reference gain exceeds the second limit value, the gain of the variable amplifier is set to the second limit value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The embodiments of the present invention will be described below with reference to the accompanying drawing.

(First Embodiment)

Figure 4:
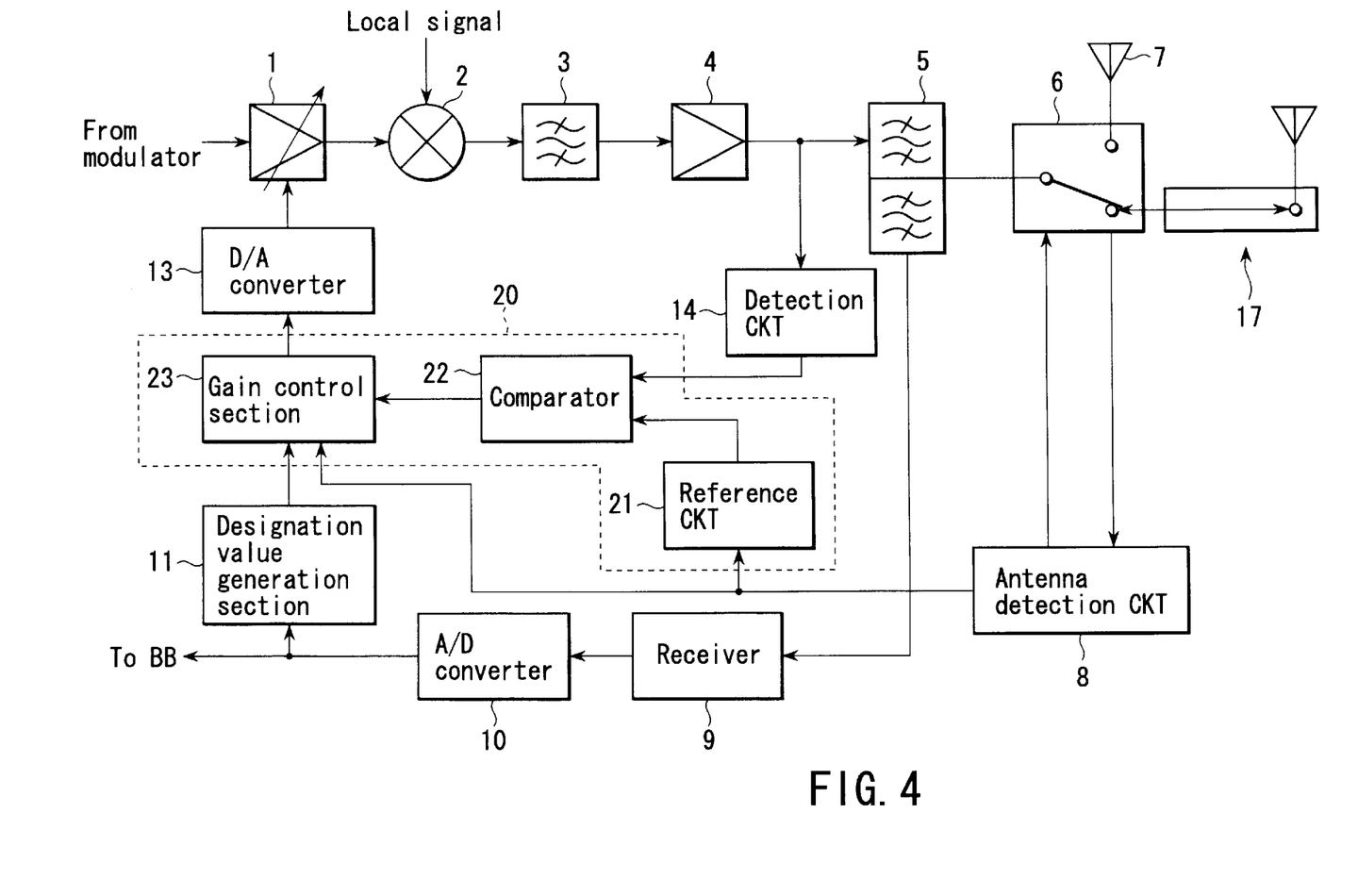
FIG. 4 is a block diagram showing a radio communication apparatus according to a first embodiment of the present invention.

FIG. 4 is a block diagram showing a radio communication apparatus according to a first embodiment of the present invention. In FIG. 4, the same reference numerals are employed to designate parts or elements corresponding to those shown in FIG. 1.

The radio communication apparatus as shown in FIG. 4 comprises a variable amplifier 1, an up-converter 2, a bandpass filter 3, power amplifier 4, a duplexer 5, an antenna switching unit 6, a standard antenna 7, an antenna detection circuit 8, a receiver 9, an A/D converter 10, a designation value generation section 11, a D/A converter 13, a detection circuit 14 and a transmission power controller 20.

A transmit signal supplied from a modulator, not shown, in FIG. 4 is amplified by the variable amplifier 1. The transmit signal, after being amplified by the variable amplifier 1, is mixed at the up-converter 2 with a local signal to allow it to be up-converted to a radio frequency band. The transmit signal of a radio frequency band outputted from the up-converter 2 has its undesired frequency components eliminated by the bandpass filter 3. Further, the transmit signal coming from the bandpass filter 3 is power-amplified by the power amplifier 4 up to a power level necessary to radio transmission. The transmit signal outputted from the power amplifier 4 is supplied through the duplexer 5 and antenna switching unit 6 normally to the standard antenna 7 where it is radiated as a radio wave. It is to be noted that an external antenna 17 can be connected to the antenna switching unit 17. Whether or not the external antenna is connected is monitored by the antenna detection circuit 8. The external antenna 17, being connected, is selected by the antenna switching unit 6 under control of the antenna detection circuit 8. With the external antenna 17 thus connected, the transmit signal outputted from the power amplifier 4 is supplied through the duplexer 5 and antenna switching unit 6 to the external antenna 17 where it is radiated as a radio wave.

The antenna detection circuit 8 outputs an antenna detection signal representing a result of detection on the presence or absence of the external antenna 17. The antenna detection signal is supplied to the transmission power controller 20.

A received signal converted from a radio wave by the standard antenna 7 or the external antenna 17 is supplied to the receiver 9 through the antenna switching unit 6 and duplexer 5. The received signal is down-converted, by the receiver 9, to a signal of an intermediate frequency band and demodulated to provide a received signal of a baseband. The received signal outputted from the receiver 9 is converted to a digital signal and then supplied to a baseband processing section, not shown, in FIG. 4.

The received signal from the A/D converter 10 is supplied also to the designation value generation section 11 where a reception power is detected based on the level of the received signal. The designation value generation section 11 determines a gain value based on the detected reception power and a previously determined relation between reception power and the gain value. The designation value generation section 11 supplies the determined gain value as a gain designation value G1 to the transmission power controller 20.

The D/A converter 13 converts a gain controlled value which is discretely outputted from the transmission power controller 20 as will be set out below to an analog version to generate a gain control signal. The D/A converter 13 supplies the gain control signal to the variable amplifier 1.

The transmit signal outputted from the power amplifier 4 is inputted to the detection circuit 14. The detection circuit 14 detects the inputted transmit signal and detects its power value. The detection circuit 14 supplies a detected power value (hereinafter referred to a detected value) to a transmission power controller 20.

The transmission power controller 20 has a reference circuit 21, comparator 22 and gain control section 23 as shown in FIG. 4. And an antenna detection signal which is outputted from the antenna detection circuit 8 is inputted to the reference circuit 21 and gain control section 23. The gain designation value G1 supplied from the designation value generation section 11 is inputted to the gain control section 23. The detected value supplied from the detection circuit 14 is inputted to the comparator 22.

The reference circuit 21 selects either of two predetermined reference values REF1 and REF2 on the basis of the antenna detection signal. The reference circuit 21 supplies a selected reference value to the comparator 22. The reference value REF1 is set to the same level as that of the output level of the detection circuit 14 at a time when the transmit output from the standard antenna 7 becomes a maximal transmission power. The reference value REF2 is set to the same value as the output level of the detection circuit 14 at the time when the transmit output from the external antenna 17 becomes a maximal transmission power.

The comparator 22 makes a comparison between the reference value supplied from the reference circuit 21 and the detected value supplied from the detection circuit 14. The comparator supplies a difference value between the detected value and the reference value to the gain control section 23.

The gain control section 23 comprises a microprocessor, etc., and has the function as a second deciding section and gain control section.

The function as the second deciding section comprises making a decision on a gain (hereinafter referred to as a gain designation value) G2 for feedback control based on the difference value supplied by the comparator 22. In the decision of the gain designation value G2, the gain control section 23 increases or decreases the gain designation value G2 in accordance with the large/small relation between the reference value and the detected value. In this connection it is to be noted that the gain control section 23 takes a different range of the gain designation value G2 depending upon whether or not the external antenna 17 is connected.

The function as the gain control section comprises making a decision on the gain control value on the basis of the gain designation value G1 supplied from the designation value generation section 11 and gain designation value G2 decided by the above-mentioned second deciding section and controlling the gain of the variable amplifier 1 by outputting the decided value to the A/D converter 13.

The operation of the radio communication apparatus thus constructed will be explained below. In this connection it is to be noted that the basic signal transmit/receive operation is the same as that of the existing same kind of radio communication apparatus and its explanation is, therefore, omitted. Here, an explanation will be made below about the processing on the transmission power control.

Figure 5:
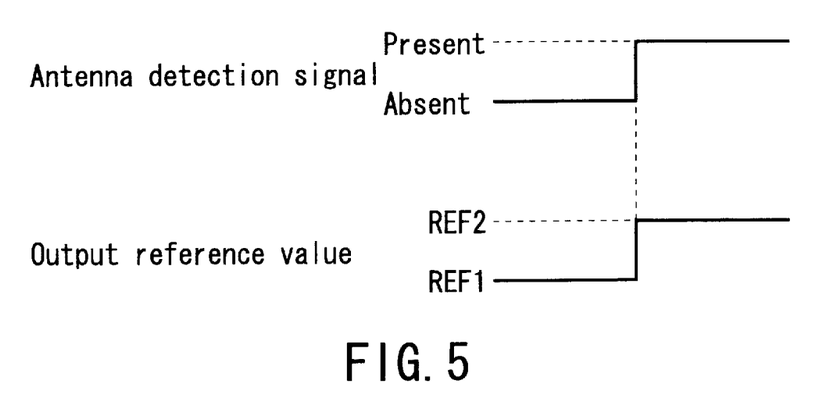
FIG. 5 is a view showing a relation of the presence/absence of the external antenna 17 to the output of the reference circuit 21.

As shown in FIG. 5, the reference circuit 21 outputs a reference value REF1 when the antenna detection signal shows the absence of the external antenna. The reference circuit 21 outputs a reference value REF2 when the antenna detection signal shows the presence of the external antenna.

Figure 6:
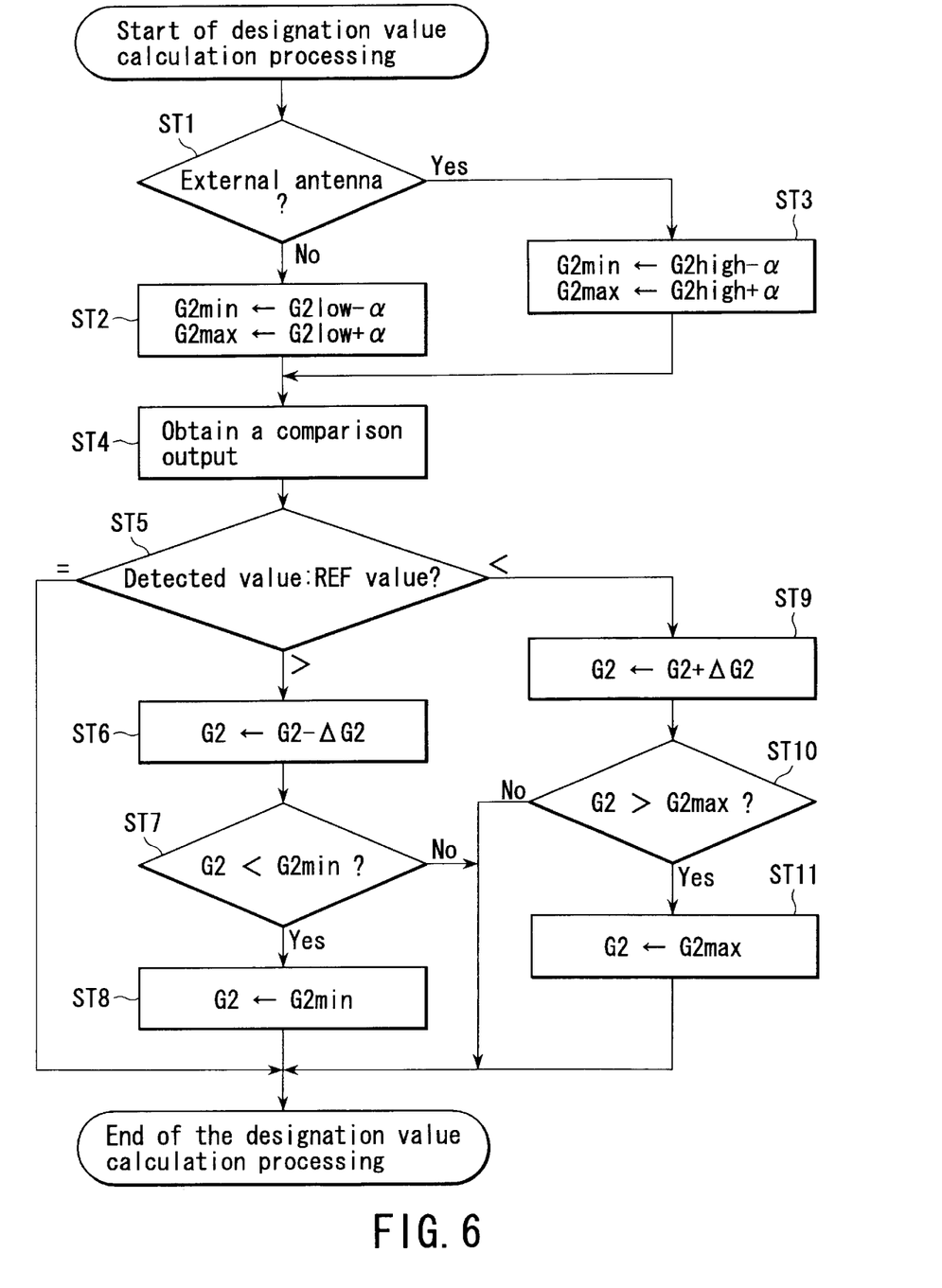
FIG. 6 is a flow chart of designation value calculation processing in the first embodiment.

The gain control section 23 repeatedly performs designation value calculation processing as shown in FIG. 6 at predetermined time intervals.

In the designation value calculation processing, the gain control section 23 first checks an antenna detection signal and confirms whether or not the external antenna 17 is connected (step ST1). If the gain control section 23 confirms that the external antenna 17 is connected, then it calculates a lower limit value G2min of a variable range of the gain designation value G2 as being G2low−α and an upper limit value G2max as being G2low+α (step ST2). If the connected state of the external antenna 17 is confirmed at step ST1, then the gain control section 23 calculates a lower limit value G2min of a variable range of the gain designation value G2 as being G2high−α and an upper limit value G2max as being G2high+α (step ST3). Here, G2high is taken as a gain of the variable amplifier 1 at a time when, in an ideal operation state, for example, a transmission power from the standard antenna 7 becomes a maximum transmission power. Further, G2high is taken as a gain of the variable amplifier 1 at a time when, in the ideal operation state, for example, the transmission power from the external antenna 17 becomes a maximal transmission power. According to the present embodiment, it is supposed that the loss of the external antenna 17 are greater than those of the standard antenna 7 and hence G2low<G2high. Further, α denotes a margin of the gain determined in accordance with a variation width of the transmission power under feedback control. Thus, the value of the margin α is arbitrarily determined, taking into consideration the magnitude of a variation of the transmission power with the gain of the variable amplifier 1 set in a fixed state, an allowable range of a transmission power variation at a time of a maximal transmission power and so on. The margin α is adequately smaller than the variable width of the gain designation value G1.

If, at step ST2 or ST3, the variable range of the gain designation value G2 is determined, then the gain control section 23 obtains in a difference value outputted from the comparator 22 (step ST4). The gain control section 23 confirms the large/small relation between the detected value and the reference value on the basis of the obtained difference value (step ST5).

If the gain control section 23 confirms that the detected value is greater than the reference value, then it varies the gain designation value G2 to a value obtained by subtracting a unit variation amount ΔG2 from its current value (step ST6). The gain control section 23 confirms whether or not the varied gain designation value G2 is lower than the minimum value G2min of the variable range (step ST7). If the gain control section 23 confirms that the gain designation value G2 is not lower than the minimum value G2min of the variable range, then it terminates the designation value calculation processing as it is and the value obtained at step ST6 is determined as being a gain designation value G2. If, however, the gain control section 23 confirms at a step ST7 that the gain designation value G2 is lower than the minimum value G2min of the variable range, then it re-sets the gain designation value G2 to G2min (step ST8). And the gain control section 23 terminates the designation value calculation processing.

If, on the other hand, the gain control section 23 confirms that the detected value is smaller than the reference value at step ST5, then it varies the gain designation value G2 to a value obtained by increasing a unit variation amount ΔG2 from that current value (step ST9). The gain control section 23 confirms whether or not the varied gain designation value G2 is greater than the maximum value G2max of the variable range (step ST10). If the gain control section 23 confirms that the gain designation value G2 is greater than the maximum value G2max of the variable range, then it terminates the designation value calculation processing as it is and the value obtained at step ST9 is determined as a gain designation value G2. If, however, the gain control section 23 confirms at step S10 that the gain designation value G2 is greater than the maximum value G2max of the variable range, then it re-sets the gain designation value G2 to G2max (step ST11). And the gain control section 23 terminates the designation value calculation processing.

Incidentally, if the gain control section 23 confirms at step ST5 that the difference value is "0" and a coincidence between the detected value and the reference value is, then it terminates the designation value calculation processing and the gain designation value G2 is maintained as a current value.

If, in this way, the external antenna 17 is not connected, the gain designation value G2 is set within a range of G2low±α. IF, on the other hand, the external antenna 17 is connected, the gain designation value G2 is set within a range of G2high±α.

Figure 7:
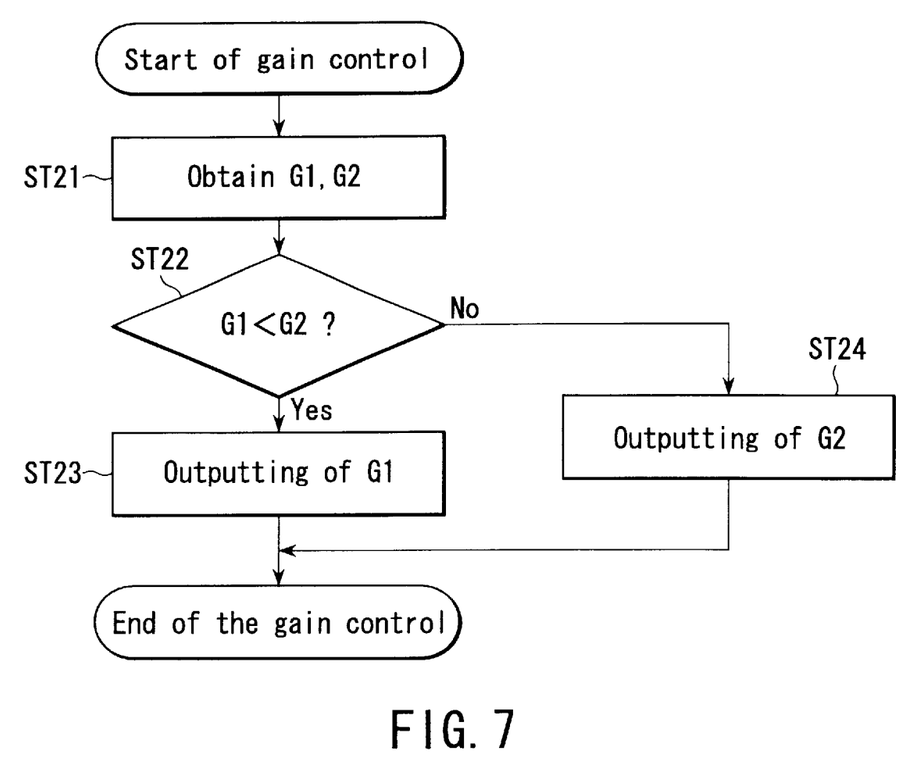
FIG. 7 is a flow chart of gain control.

In addition to the designation value calculation processing as set out above, the gain control section 23 repeatedly performs gain control as shown in FIG. 7 at predetermined time intervals.

In the gain control, the gain control section 23 obtains the gain designation value G1 outputted from the designation value generation section 11 and most recent gain designation value G2 set by the above-mentioned designation value calculation processing (step ST21). The gain control section 23 effects a comparison between the obtained gain designation values G1 and G2 to confirm whether or not the gain designation value G2 is greater than the gain designation value G1 (step ST22).

The gain control section 23, if confirming the gain designation value G2 as being greater than the gain designation value G1, outputs the gain designation value G1 as a gain control value (step ST23). The gain control section 23, if confirming the gain designation value G1 as being greater than or equal to the gain designation value G2 at step ST1, outputs the gain destination value G2 as a gain control value (step ST24). If the outputting of the gain control value is thus effected at step ST23 or step ST 24, then the gain control section 23 terminates the gain control.

Figure 8:
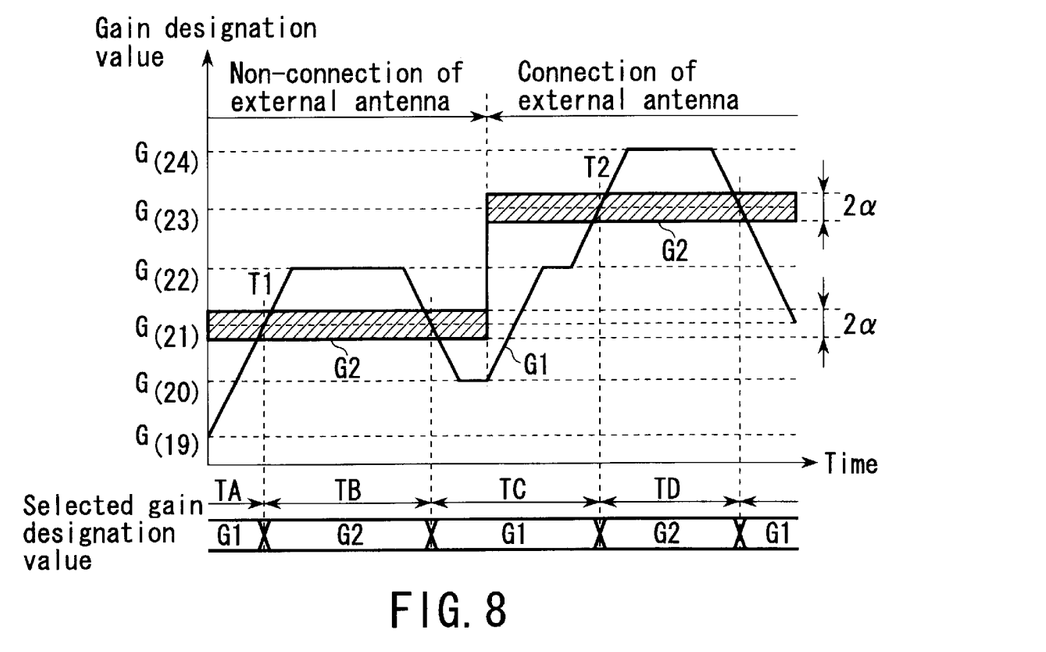
FIG. 8 is a view showing a practical form when gain designation values G1 and G2 are selected as a gain control value.

Thus, with the external antenna 17 not connected, the gain designation value G2 is present in a 2α width range with the G2low as a center. In FIG. 8, the G2low is shown as $G_{(21)}$. The range of the gain designation value G2 is shown cross-hatched.

With the external antenna 17 is connected, the gain designation value G2 is present in a 2α width range with the G2high as a center. In FIG. 8, the G2high is shown as $G_{(23)}$.

It is to be noted that $G_{(x)}$ in FIG. 8 shows a gain value at which, in an ideal operation state, the transmission power from the standard antenna 7 becomes x[dBm]. That is, $G_{(21)}$ shows a gain value at which, in the ideal operation state, the transmission power from the standard antenna 7 becomes 21[dBm]. In an example in FIG. 8, in the ideal operation state, the transmission power from the standard antenna 7 is set to 21[dBm] and the maximum transmission power is 21[dBm]. Further, in the ideal operation state, G2high is set to a gain value at which the transmission power from the standard antenna 7 becomes 23[dBm] and, in this example, the loss at the external antenna 17 is 2[dBm] greater than that of the standard antenna 7.

If, under such conditions, the gain designation value G1 varies as shown in FIG. 8, the gain designation value G1 at a time period TA is lower than the gain designation value G2 and the gain designation value G1 is selected and outputted as a gain control value. Thus, the gain of the variable amplifier 1 is controlled in a variable way in accordance with the reception power, and the transmission power becomes a value corresponding to the reception power.

when the gain designation value G1 is raised to near $G_{(21)}$, it becomes greater than or equal to the gain designation value G2 (time T1). Since the gain designation value G2 varies in a 2α width, the time at which the gain designation value G1 becomes greater than or equal to the gain designation value G2 is sometimes shifted from the time T1. Since, however, the varying width 2α of the gain designation value G2 is adequately smaller relative to a variation in the gain designation value G2, the designation value G1 can be regarded as becoming greater than or equal to the gain designation value G2 at a time at which the gain designation value G1 is greater than or equal to $G_{(21)}$.

Thus at a time period TB at which the gain designation value G1 is greater than or equal to $G_{(21)}$, the gain designation value G2 is selected and outputted as a gain control value. At the time period TB, a feedback loop is formed by the detection circuit 14, reference circuit 21, comparator 22 and gain control section 23. Through this feedback loop, the gain of the variable amplifier 1 is fine adjusted near $G_{(21)}$ so as to allow the detected value of the detection circuit 14 to coincide with the reference value REF1 outputted from the reference circuit 21. That is, in order to allow the power value of the transmit signal which is outputted from the power amplifier 4 to coincide with a value at which the transmission power from the standard antenna 7 becomes a maximal transmission power, the gain of the variable amplifier 1 is fine adjusted near $G_{(21)}$.

In this way, the power level of the transmit signal is restricted by using, as a limit value, a level at which the transmission power from the standard antenna 7 becomes 21 dBm. As a result, the transmission power from the standard antenna 7 is suppressed to equal or below the maximum transmission power.

With the external antenna in the connected state, the gain designation value G2 is raised to $G_{(23)}$. Even if, therefore, the gain designation value G1 is raised, as at time period TC, to near $G_{(21)}$, the gain designation value G1 is lower than the gain designation value G2 and, continuously, the gain designation value G1 is selected and outputted as a gain control value. Although in this way the gain of the variable amplifier 1 is raised in excess of the reference limit value $G_{(21)}$ of the gain, the transmission power of the external antenna 17 does not exceed the maximum transmission power because the transmit signal suffers a 2[dBm] extra loss due to the external antenna 17.

When the gain designation value G1 is raised to near $G_{(23)}$, the gain designation value G1 becomes greater than or equal to the gain designation value G2 (time T2). In this connection it is to be noted that, since the gain designation value G2 varies in a 2α width even at this time, the time at which the gain designation value G1 exceeds the gain designation value G2 is sometimes shifted in actual case from the time T2. Since the variation width 2α of the gain designation value G2 is adequately smaller relative to a variation of the gain designation value G2, the gain designation value G1 can be regarded as becoming greater than or equal to the gain designation value G2 at a time T2 at which the gain designation value G1 becomes greater than or equal to $G_{(23)}$.

Thus at a time period TD in which the gain designation value G1 is greater than or equal to $G_{(23)}$, the gain designation value G2 is selected and outputted as a gain control value. At the time period TD, the feedback loop is formed by the detection circuit 14, reference circuit 21, comparator 22 and gain control section 23. Through this feedback loop, the gain of the variable amplifier 1 is fine adjusted near $G_{(23)}$ so as to allow the detected value of the detection circuit 14 to coincide with the reference valve REF2 outputted from the reference circuit 21. That is, in order to allow the power value of the transmit signal which is outputted from the power amplifier 4 to coincide with a value at which the transmission output from the external antenna 17 becomes a maximal transmission power, the gain of the variable amplifier 1 is fine adjusted near $G_{(23)}$.

In this way, the power level of the transmit signal is restricted by using, as a limit value, a level at which the transmission power from the standard antenna 7 becomes 23 dBm. By doing so, the transmission power from the external antenna 17 can be raised to near the maximum transmission power but does not exceed the maximum transmission power.

Figure 9:
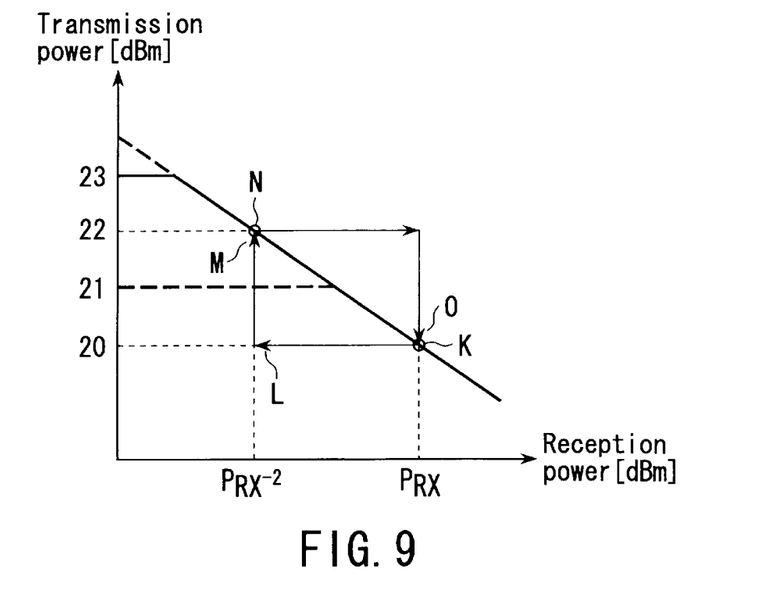
FIG. 9 is an explanatory view showing a state in which a lowering in transmission power is compensated.

That is, as shown in FIG. 9, suppose that, from a state in which the operation point is located to a point K near the maximum transmission power "21" under the use of the standard antenna 7, a loss is 2 dBm raised with the external antenna 17 connected. At this time, the reception power detected by the designation value generation section 11 is lowered to $P_{RX}$–2 as indicated by an allow L. In this case, the designation value generation section 11 raises a gain as indicated by an arrow M to allow the transmission power to be increased to 22 dBm, so that the operation point is varied to a point N. This causes the output level of the variable amplifier 1 to be raised up to a level at which a signal is transmitted from the standard antenna with a transmission power of 18 dBm. As indicated by an arrow O, however, a loss arises due to the external antenna 17. As a result, an actual transmission power becomes 20 dBm and that operation is done at the same operation point K as at the time of using the standard antenna 7.

According to the first embodiment, as set out above, the actual transmission power can be raised up to the maximum transmission power even if the external antenna 17 is used. As a result, it is possible to perform a transmit operation under the same condition even if use is made of either of the standard antenna 7 and external antenna 17.

(Second Embodiment)

Figure 10:
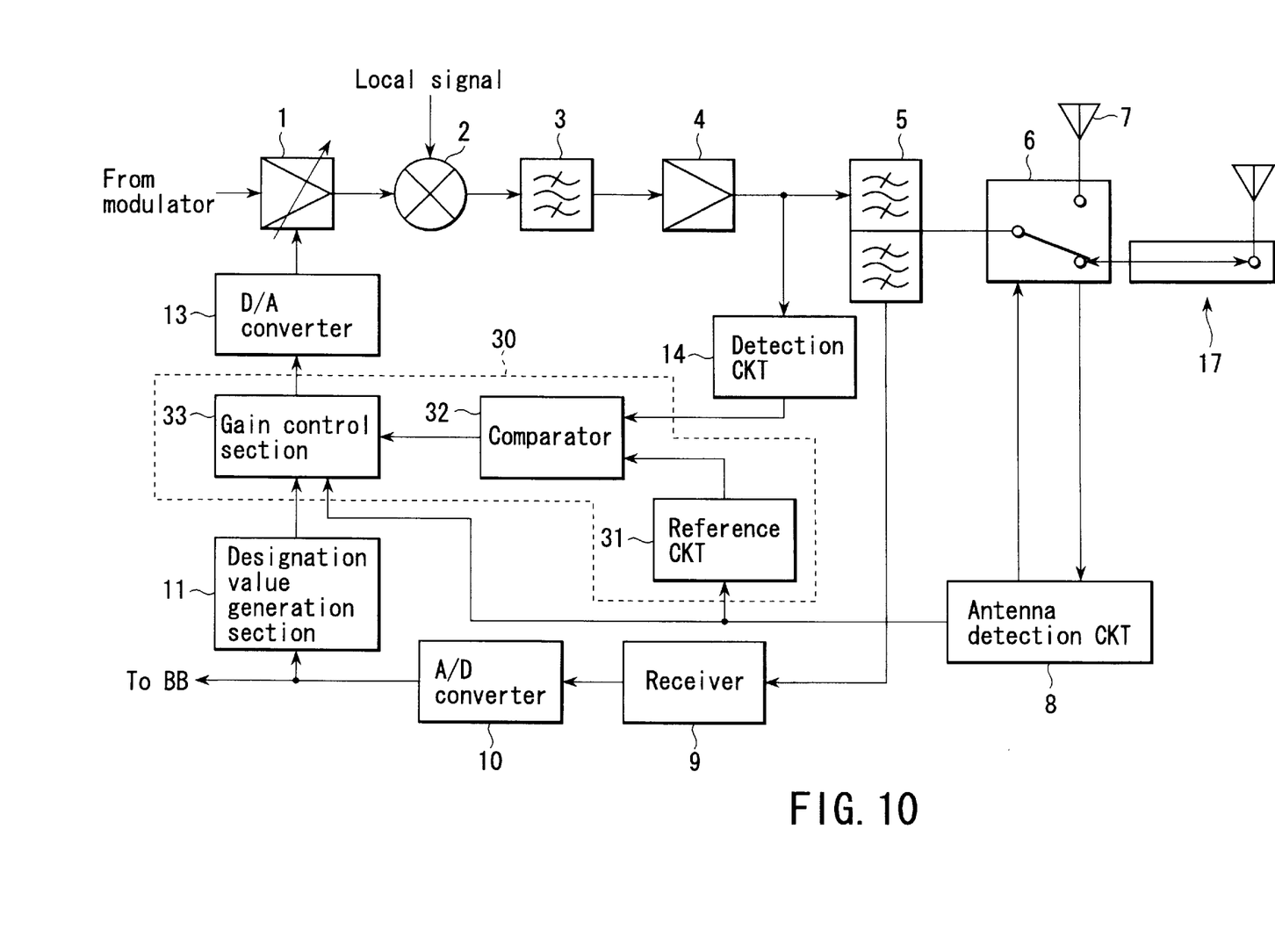
FIG. 10 is a block diagram showing a radio communication apparatus according to a second embodiment of the present invention.

FIG. 10 is a block diagram showing a radio communication apparatus according to the second embodiment of the present invention. In FIG. 10, the same reference is used to designate parts or elements corresponding to those shown in FIG. 4 and any detailed explanation of it is, therefore, omitted.

The radio communication apparatus of the second embodiment shown in FIG. 10 comprises a variable amplifier 1, an up-converter 2, a bandpass filter 3, a power amplifier 4, a duplexer 5, an antenna switching unit 6, a standard antenna 7, an antenna detection circuit 8, a receiver 9, an A/D converter 10, a designation value generation section 11, a D/A converter 13, a detection circuit 14 and a transmission power controller 30.

That is, in the radio communication apparatus of the second embodiment, a transmission power controller 30 is provided in place of the transmission power controller 20 in the radio communication apparatus of the first embodiment.

The transmission power controller 30 has a reference circuit 31, comparator 32 and gain control section 33 as shown in FIG. 10. An antenna detection signal outputted from the antenna detection circuit 8 is inputted to the gain control section 33. A gain designation value G1 supplied from the designation value generation section 11 is inputted to the gain control section 33. A detected value supplied from the detection circuit 14 is inputted to the comparator 32.

The reference circuit 31 supplies a predetermined reference value REF1 to the comparator 22.

The comparator 32 effects a comparison between the reference value REF1 supplied from the reference circuit 31 and the detected value supplied from the detection circuit 14. The comparator 32 supplies a difference value between the detected value and the reference value to the gain control section 33.

The gain control section 33 comprises a microprocessor, etc., and has the function as a second deciding section and that as a gain control section.

The function as a second deciding section comprises deciding a gain designation value G2 for feedback control based on the difference value supplied from the comparator 32. In the decision of the gain designation value G2, the gain control section 33 increases/decreases the gain designation value G2 in accordance with a large/small relation between the reference value and the detected value. The gain control section 33 allows a range of the gain designation value G2 to be made different depending upon whether or not an external antenna 17 is connected.

The function as a second control section controls the gain of the variable amplifier 1 by deciding a gain control value based on a gain designation value G1 supplied from the designation value generation section 11 and gain designation value G2 decided by the above-mentioned second deciding section and outputting it to the D/A converter 13.

The operation of thus arranged radio communication apparatus will be explained below. It is to be noted that the basic signal transmit/receive operation is the same as that of the existing kind of radio communication apparatus and its operation is, therefore, omitted. Here, an explanation will be made below about the processing relating to the control of the transmission power.

The control of the transmission power in the second embodiment is basically the same as that of the control of the transmission power in the first embodiment. However, the second embodiment can perform the same transmission power control through a feedback loop as the first embodiment, by fixing a reference value which is outputted from the reference circuit 31 to REF1 and changing the designation value calculation processing at the gain control section 33 as will be set out below.

Figure 11:
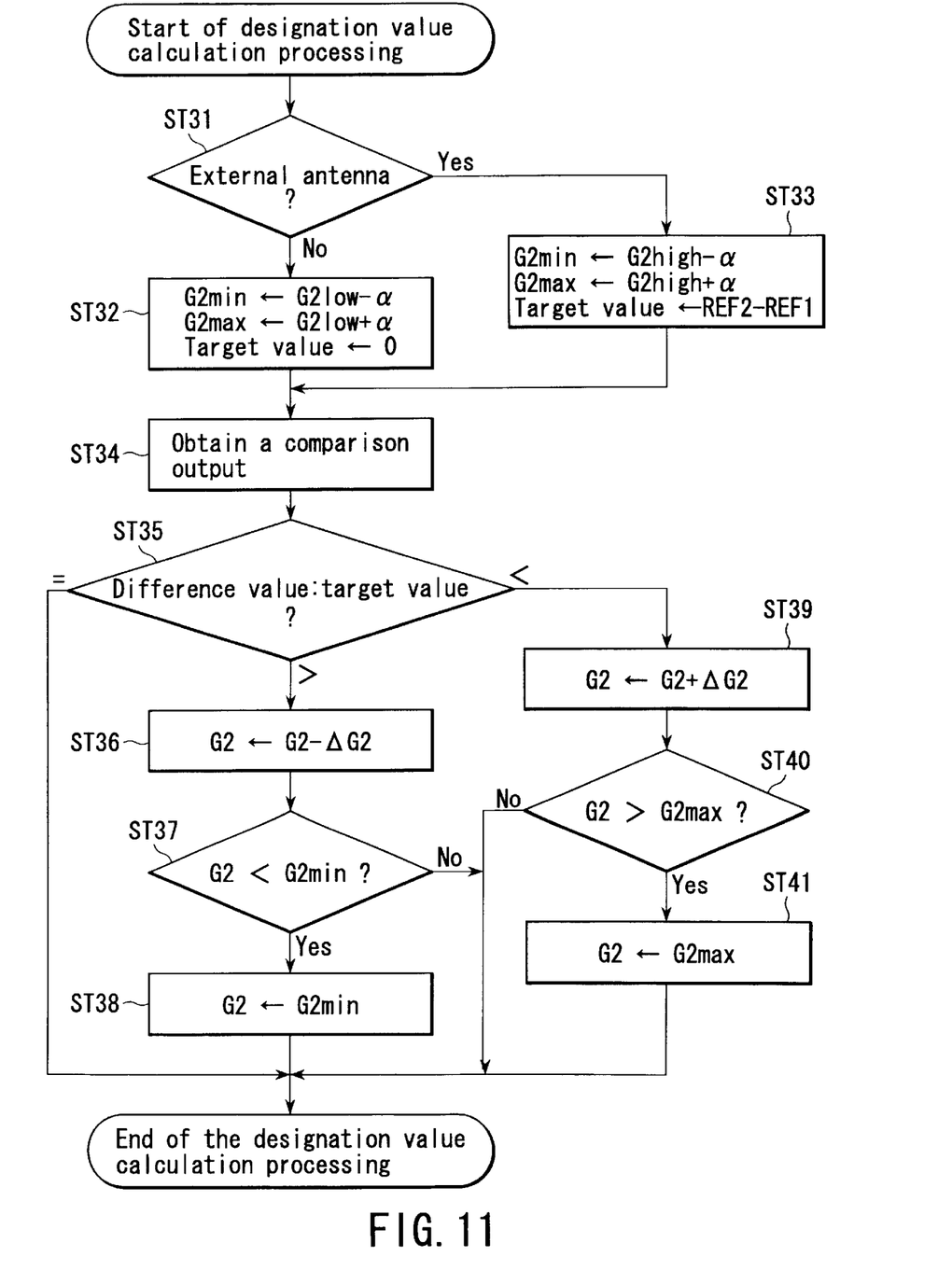
FIG. 11 is a flow chart showing designation value calculation processing in the second embodiment.

The gain control section 33 repeatedly performs the designation value calculation processing, at predetermined time intervals, as shown in FIG. 11.

In this designation value calculation processing, the gain control section 33 first confirms an antenna detection signal and confirms whether or not the external antenna 17 is connected (step ST31). If the gain control section 33 confirms that the external antenna 17 is not connected, then it calculates a lower limit value G2min of a variable range of the gain designation value G2 as being G2low−α and an upper limit value G2max as being G2low+α and sets a "0" as a target value (step ST32). If the gain control section 33 confirms that the external antenna 17 is connected, then it calculates a lower limit value G2min of a variable range of the gain designation value G2 as being G2high−α and an upper limit value G2max as being G2high+α and sets a value of REF2-REF1 as a target value (step ST33).

If the variable range of the gain designation value G2 and target value are decided at step ST32 or ST33, then the gain control section 33 obtain the difference value outputted from the comparator 32 (step ST34). The gain control section 33 confirms a large/small relation between the obtained difference value and the target value (step ST35).

If the gain control section 33 confirms that the difference value is greater than the target value, then it varies the gain designation value G2 to a value obtained by subtracting a unit variation amount ΔG2 from the current value (step ST36). The gain control section 33 confirms whether or not this varied gain designation value G2 is lower than the minimum value G2min of the variable range (step ST37). If the gain control section 33 confirms that gain designation value G2 is not lower than the minimum value G2min, then it terminates the designation value calculation processing and determines a value which is obtained at step ST36 as a gain designation value G2. If, on the other hand, the gain control section 33 confirms that the gain designation value G2 is lower than the minimum value G2min of the variable range at step ST37, then it resets the gain designation value G2 to G2min (step ST38). This terminates the designation value calculation processing.

If the gain control section 33 confirms that the difference value is lower than the target value at step ST35, then it varies the gain designation value G2 to a value obtained by increasing a unit variation amount ΔG2 from the current value (step ST39). The gain control section 33 confirms whether or not a varied gain designation value G2 exceeds the maximum value G2max of the variable range (step ST40). If the gain control section 33 confirms that the gain designation value G2 is not higher than the maximum value G2max of the variable range, then it terminates the designation value calculation processing as it is and, by doing so, a value obtained at step ST39 is determined as a gain designating value G2. If the gain control section 33 confirms that the gain designation value G2 is higher than the maximum value G2max of the variable range, the it re-sets the gain designation value G2 to G2max (step ST41). Then the gain control section 33 terminates the designation value calculation processing.

It is to be noted that, if the gain control section 33 confirms that a coincidence between the difference value and the target value at step ST35, then it terminates the designation value calculation processing as it is, so that the gain designation value G2 is maintained as a current value.

If, in this way, the external antenna 17 is not connected, then the gain designation value G2 is set in a range of G2low±α and, if on the other hand, the external antenna 17 is connected, the gain designation value G2 is set in a range of G2high±α.

According to the second embodiment, as set out above, through the varying of the target value, the target state met by the feedback loop is changed to a state of a coincidence between the detected value and the reference value REF1 when the external antenna is not connected and to a state of a coincidence between a difference of the detected value and reference value REF1, on one hand, and a difference value of the reference value REF1 relative to the reference value REF2, on the other hand, when the external antenna 17 is connected.

By doing so, according to the second embodiment, the same operation as in the first embodiment can be realized while adopting a simpler arrangement of the reference circuit 31.

The present invention is not restricted to the above-mentioned embodiments. Although, in the respective embodiment above, the gain designation value has been explained as being utilized as a threshold value for deciding a switching between the open loop control and the feedback control based on the reception power, use can also be made of, as the threshold value, the fixed values such as G2low or G2high.

Although, in the respective embodiment above, the external antenna, if being connected, has been explained as being used, an antenna can be arbitrarily switched to another antenna under a predetermined condition such as a user-designation condition. In this case, the gain control methods need to be switched not only depending upon whether or not the external antenna is connected but also according to whether the standard antenna 7 or external antenna 7 is selected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus for varying a transmission power in accordance with a reception power in a range not exceeding a predetermined maximum transmission power, comprising:

a variable amplifier configured to amplify a transmit signal, the gain of the variable amplifier being variable upon amplification;

a first antenna;

an antenna switching unit detachable to a second antenna and configured to select one of the first and second antennas if the second antenna is attached to the apparatus; and a transmission power controller configured to control the gain of the variable amplifier such that if the antenna switching unit selects the first antenna and a standard gain determined in accordance with the reception power does not exceed a first predetermined limit value determined by the maximum transmission power and power loss at the first antenna, the gain of the variable amplifier is set to the standard gain;

if the antenna switching unit selects the first antenna and the reference gain exceeds the first limit value, the gain of the variable amplifier is set to the first limit value;

if the antenna switching circuit selects the second antenna and the standard gain does not exceed a second predetermined limit value determined by correcting the first control value based on a difference between a power loss at the first antenna and a power loss at the second antenna, the gain of the variable amplifier is set to the standard gain; and if the antenna switching unit selects the second antenna and the standard gain exceeds the second limit value, the gain of the variable amplifier is set to the second limit value.

2. The radio communication apparatus according to claim 1, further comprising:

a first deciding section configured to decide a first gain in accordance with the reception power which is past that antenna selected by the antenna switching unit; and a detection section configured to detect a power value of a transmit signal supplied to the first antenna or second antenna through the antenna switching unit, said transmission power controller comprising:

an outputting section configured to output a first reference power value determined based on the first limit value when the antenna switching unit selects the first antenna and to output a second reference power value determined based on the second limit value when the antenna switching unit selects the second antenna;

a comparing section configured to make a comparison between a power value detected by the detecting section and the first reference power value or second reference power value outputted from the outputting section;

a second deciding section configured to decide a second gain on the basis of an output of the comparing section in a predetermined range with the first limit value as a center when the antenna switching unit selects the first antenna and in a predetermined range with the second limit value as a center when the antenna switching unit selects the second antenna; and a gain control section configured to set the gain of the variable amplifier to the first gain when the first gain is smaller than the second gain and to set the gain of the variable amplifier to the second gain when the first gain equal or exceeds the second gain.

3. The radio communication apparatus according to claim 1, further comprising:

a first deciding section configured to decide a first gain in accordance with a reception power which is past that antenna selected by the antenna switching unit; and a detection section configured to detect a power value of a transmit signal supplied to the first antenna or second antenna through the antenna switching unit, said transmission power controller comprising:

an outputting section configured to output a predetermined basic reference power value;

a power difference calculation section configured to calculate a difference between a power value detected by the detecting section and the reference power value outputted from the outputting section;

a second deciding section configured to decide a second gain in a predetermined range with the first limit value as a center so as to allow a value which is calculated by the power difference calculation section to be made equal to a difference between a first reference power value determined based on the first limit value and the basic reference power value when the antenna switching unit selects the first antenna and to decide a second gain in a predetermined range with the second limit value as a center so as to allow a value which is calculated by the power difference calculation section to be made equal to a difference between a second reference power value determined based on the second limit value and the basic reference power value when the antenna switching unit selects the second antenna; and a gain control section configured to set the gain of the variable amplifier to the first gain when the first gain is smaller than the second gain and to set the gain of the variable amplifier to the second gain when the first gain equal or exceeds the second gain.

4. A transmission power controlling apparatus supplied to a radio communication apparatus adapted to vary a transmission power in accordance with a reception power in a range not exceeding a predetermined maximum transmission power and comprising a variable amplifier configured to amplify a transmit signal, the gain of the variable amplifier being variable upon amplification, a first antenna and an antenna switching unit arbitrarily connectable to a second antenna and configured to select one of the first antenna and second antenna, said transmission power controlling apparatus controlling the transmission power at the radio communication apparatus and comprising a transmission power controller configured to control a gain of that variable amplifier such that if the antenna switching unit selects the first antenna and a reference gain determined in accordance with the reception power does not exceed a first predetermined limit value determined by the maximum transmission power and power loss at the first antenna, a gain of the variable amplifier is set to the reference gain;

if the antenna switching unit selects the first antenna and the reference gain exceeds the first limit value, the gain of the variable amplifier is set to the first limit value;

if the antenna switching unit selects the second antenna and the reference gain does not exceed a second predetermined limit value determined by correcting the first limit value based on a difference between a power loss at the first antenna and a power loss at the second antenna, the gain of the variable amplifier is set to the reference gain; and if the antenna switching unit selects the second antenna and the reference gain exceeds the second limit value, the gain of the variable amplifier is set to the second limit value.

5. The transmission power controlling apparatus according to claim 4, in which said application site radio communication apparatus has a first deciding section configured to decide a first gain in accordance with a reception power which is past that antenna selected by the antenna switching unit and a detection section configured to detect a power value of a transmit signal supplied to the first antenna or second antenna through the antenna switching unit, said transmission power controller comprising:

an outputting section configured to output a first reference power value determined based on the first limit value when the antenna switching unit selects the first antenna and to output a second reference power value determined based on the second limit value when the antenna switching unit selects the second antenna;

a comparing section configured to make a comparison between a power value detected by the detecting section and the first reference power value or second reference power value outputted from the outputting section;

a second deciding section configured to decide a second gain based on the output from the comparing section in a predetermined range with the first limit value as a center when the antenna switching unit selects the first antenna and in a predetermined range with the second limit value as a center when the antenna switching unit selects the second antenna; and a gain control section configured to set the gain of the variable amplifier to the first gain when the first gain is smaller than the second gain and to set the gain of the variable amplifier to the second gain when the first gain equal or exceeds the second gain.

6. The transmission power controlling apparatus according to claim 4, in which said application site radio communication apparatus has a first deciding section configured to decide a first gain in accordance with a reception power which is past an antenna selected by the antenna switching unit and a detection section configured to detect a power value of a transmit signal supplied to the first antenna or second antenna past the antenna switching unit, said transmission power controller comprising:

an outputting section configured to output a predetermined basic reference power value;

a power difference calculating section configured to calculate a difference between the power value detected by the detecting section and the reference power value outputted from the outputting section;

a second deciding section configured to decide a second gain in a predetermined range with the first limit value as a center so as to allow a value which is calculated by the power difference calculating section to be made equal to a difference between a first reference power value determined based on the first limit value and the basic reference power value when the antenna switching unit selects the first antenna and to decide a second gain in a predetermined range with the second control value as a center so as to allow a value which is calculated by the power difference calculating section to be made equal to a difference between a second reference power value determined based on the second limit value and the basic reference power value when the antenna switching unit selects the second antenna; and a gain control section configured to set the gain of the variable amplifier to the first gain when the first gain is smaller than the second gain and to set the gain of the variable amplifier to the second gain when the first gain exceeds the second gain.

* * * * *